United States Patent
Li et al.

(10) Patent No.: US 11,520,983 B2
(45) Date of Patent: Dec. 6, 2022

(54) METHODS AND SYSTEMS FOR TRENDING ISSUE IDENTIFICATION IN TEXT STREAMS

(71) Applicant: Apple Inc., Cupertino, CA (US)

(72) Inventors: Jiachen Li, Sunnyvale, CA (US); Zhou Li, Mountain View, CA (US); Daniel J. Sherman, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 618 days.

(21) Appl. No.: 16/425,854

(22) Filed: May 29, 2019

(65) Prior Publication Data

US 2020/0380074 A1 Dec. 3, 2020

(51) Int. Cl.
| | |
|---|---|
| *G06F 40/226* | (2020.01) |
| *G06F 16/28* | (2019.01) |
| *G06F 16/31* | (2019.01) |
| *H04L 51/42* | (2022.01) |
| *H04L 51/216* | (2022.01) |
| *G06N 3/08* | (2006.01) |

(52) U.S. Cl.
CPC .......... *G06F 40/226* (2020.01); *G06F 16/285* (2019.01); *G06F 16/313* (2019.01); *G06N 3/08* (2013.01); *H04L 51/216* (2022.05); *H04L 51/42* (2022.05)

(58) Field of Classification Search
None
See application file for complete search history.

(56) References Cited

U.S. PATENT DOCUMENTS

| | | | |
|---|---|---|---|
| 9,092,802 B1 | 7/2015 | Akella | |
| 9,111,218 B1 | 8/2015 | Lewis et al. | |
| 9,710,539 B2 | 7/2017 | Dey et al. | |
| 2006/0206306 A1 | 9/2006 | Cao et al. | |
| 2011/0270770 A1 | 11/2011 | Cunningham et al. | |
| 2012/0310632 A1* | 12/2012 | Hogan | G06F 40/237 704/9 |
| 2015/0161633 A1* | 6/2015 | Adams | G06Q 30/0204 705/7.33 |
| 2019/0394218 A1* | 12/2019 | Pridgen | G06F 21/552 |

* cited by examiner

*Primary Examiner* — Quynh H Nguyen
(74) *Attorney, Agent, or Firm* — Dickinson Wright RLLP

(57) ABSTRACT

This application relates to a systems and methods for trending issue identification in text streams. In one embodiment, a method for improving resolution of a trending issue identified in a set of text streams includes presenting a user interface of an application that is being executed by a computing device. The method also includes receiving a notification including the trending issue that has been identified in the set of text streams based at least in part on textual analysis performed on the set of text streams, and presenting the trending issue on the user interface of the application to enable an action to be performed to resolve the trending issue.

20 Claims, 13 Drawing Sheets

METHODS AND SYSTEMS FOR TRENDING ISSUE IDENTIFICATION IN TEXT STREAMS

FIELD

The described embodiments relate generally to textual analysis. More particularly, the present embodiments relate to methods and systems to identifying a trending issue in text streams based at least on textual analysis of the text streams.

BACKGROUND

Users may use computing devices to transmit text streams in many different forms. For example, a user may compose an electronic message (email) including a text stream and transmit the email over a network to a target email address. In other examples, text streams may be included in transcriptions of telephone calls, reviews, social media posts, text messages, chat histories, and so forth. In one specific scenario, a first user may transmit an email including a text stream when the user desires technical support and/or customer support from an entity that provides software applications and/or computing devices. In some instances, other users may transmit a similar text stream included in an email at or around the same time as the first user to the entity.

SUMMARY

Accordingly, representative embodiments set forth herein disclose various techniques for trending issue identification in text streams by performing textual analysis on the text streams. The techniques disclosed herein may identify issues that may otherwise go undiscovered and/or may identify trending issues quicker than conventional techniques. Accordingly, at least some benefits of the disclosed techniques include improved resolution speed of the trending issues identified in the text streams.

According to some embodiments, a method for improving resolution of a trending issue identified in a set of text streams, the method can include: (1) presenting a user interface of an application that is being executed by a computing device, (2) receiving a notification including the trending issue that has been identified in the set of text streams based at least in part on textual analysis performed on the set of text streams, and (3) presenting the trending issue on the user interface of the application to enable an action to be performed to resolve the trending issue.

According to some embodiments, a method for identifying a trending issue in input data including a set of text streams, the method can include: (1) receiving the input data including the set of text streams, (2) performing textual analysis on the set of text streams to determine a trending issue presented in the set of text streams, and (3) transmitting a notification pertaining to the trending issue to a computing device to enable an action to be performed to resolve the trending issue.

Other embodiments include a non-transitory computer readable storage medium configured to store instructions that, when executed by a processor included in a computing device, cause the computing device to carry out the various steps of any of the foregoing methods. Further embodiments include a computing device that is configured to carry out the various steps of any of the foregoing methods. Other embodiments include a system having a processor that is configured to carry out the various steps of any of the foregoing methods.

Other aspects and advantages of the invention will become apparent from the following detailed description taken in conjunction with the accompanying drawings that illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
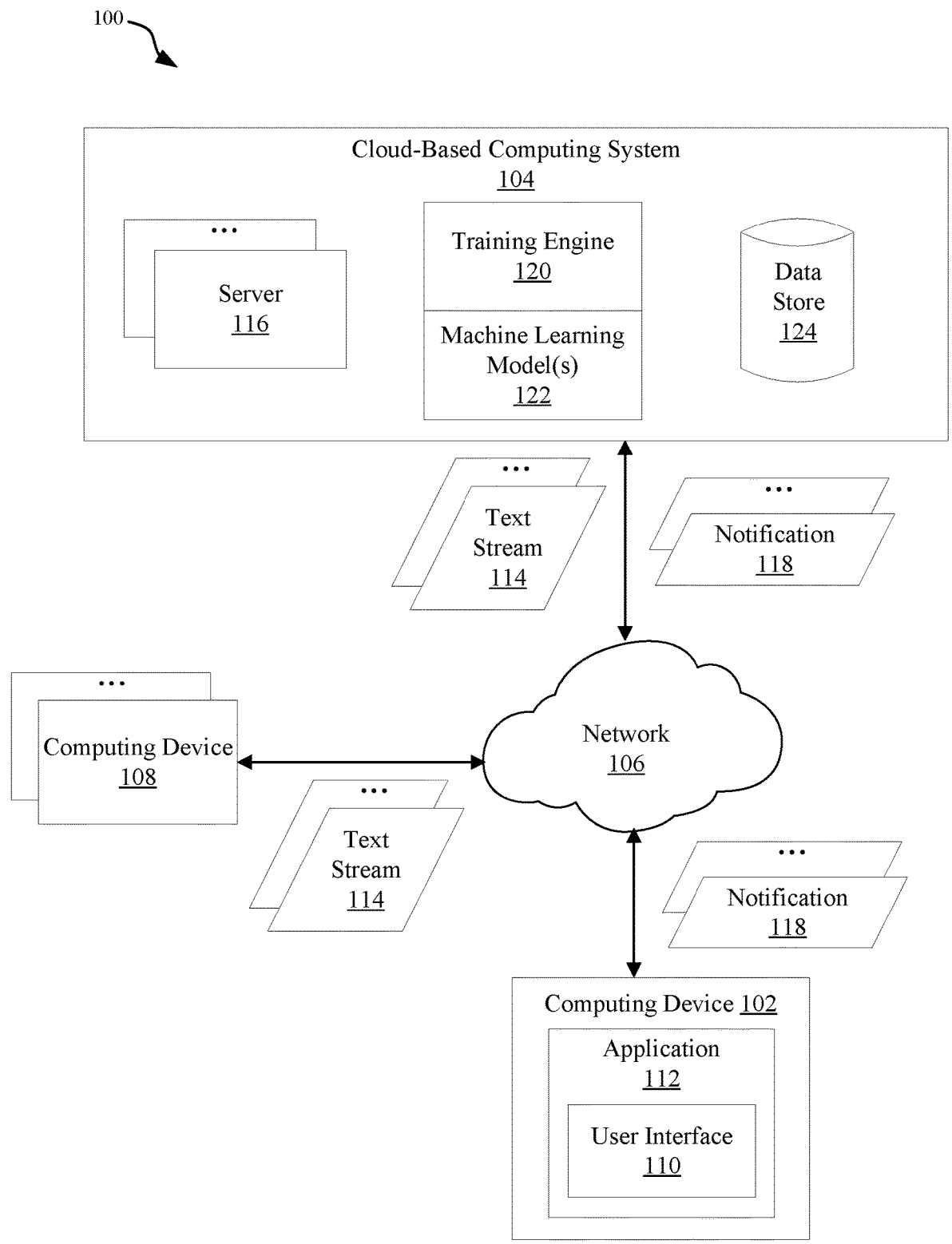
FIG. 1 illustrates a high-level component diagram of an illustrative system architecture, in accordance with some embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Identifying common themes or trends in text streams may serve important purposes for various entities. For example, entities that provide software applications (e.g., application distribution platforms ("app stores"), media distribution platforms (iTunes® by Apple® of Cupertino, Calif.), etc.), services (e.g., cloud-based storage), computing devices (e.g., smartphones, tablets, laptops, desktops, media players, etc.), etc. may benefit from being able to quickly, reliably, and/or accurately detect trending customer support issues and/or technical support issues as they arise in text streams. The disclosed techniques may enable reducing the time used to escalate issues to the proper custom support/technical support group and/or the time used to resolve the issues by the custom support/technical support group of the entities. As a result, customer experience may be improved by the disclosed techniques.

Other entities that may benefit from the disclosed techniques may include entities that monitor for malicious behavior online. The techniques may improve the speed of detection of trending issues, such as a virtual attack, that is being discussed on a chat forum, for example. As a result, the techniques may enable thwarting such trending issues that are detected in a timelier manner. Accordingly, security may be enhanced using the disclosed trending issue identification techniques.

Although the following discussion focuses on detecting issues in the customer support/technical support scenario, it should be understood that the disclosed techniques may apply to any suitable instance where it is beneficial to detect trending issues in text streams. In some instances, when users experience an issue using a software application and/or a computing device of an entity, the user may compose a text stream in an electronic message (e.g., email) and transmit the email to the entity. The issue may be any suitable issue relating to the software application, the computing device, and/or the entity. For example, the issue may relate to the software application being down, a feature of the software application not functioning properly, the computing device performing in an undesired manner in certain circumstances, the user's account needing servicing, billing questions, and so forth.

The entity may receive the email and be dispatched to a support representative. If the support representative knows what the resolution is, then the support representative may respond to the user describing the solution to the issue in the received email. However, if there is a trending issue that affects numerous users, and these numerous users are sending emails including text streams describing the trending issue to the entity, the support representative may have no way of knowing that this is a trending issue affecting multiple users. The support representative may have no way of knowing that this trending issue should be escalated quickly to a production support and/or engineering team immediately. Typically, if the support representative sees several of the same issues in a time period, the support representative may vote the issue up in a list of issues to be addressed by a production support and/or engineering team. However, this escalation process may be undesirable and the resolution time for trending issues leaves much to be desired.

Accordingly, aspects of the present disclosure generally relate to improving trending issue identification in text streams. The disclosed techniques may perform textual analysis (e.g., learning techniques, preprocessing, filtering, text mining, anomaly detection, etc.) on text streams (e.g., emails, chat histories, reviews, transcriptions, dictations, etc.) automatically to proactively identify trending issues as close to the source as possible. A trending issue may refer to an issue that is described in a threshold number of text streams in certain time period. The textual analysis may use a combination of natural language processing, machine learning models, time series anomaly detection, and so forth to identify the trending issues. The disclosed techniques may monitor the overall volume of text streams and trending issues or common themes included in the text streams. Further, the disclosed techniques may filter certain text streams that include textual patterns identified as pertaining to malicious intent or activity (e.g., spam emails, phishing emails, scam emails, etc.). The disclosed techniques may enable surfacing trending issues to the relevant support groups of an entity more quickly than the conventional voting escalation described above. Further, the disclosed techniques may enable identifying and flagging trending issues that may otherwise go undetected. This may lead not only to an improved customer experience, but to an optimization of the workflow for production support and/or engineering teams to resolve the trending issues that may be detected more quickly.

The identified trending issues in the text streams may be presented in a support user interface on a computing device to enable an action to be performed to resolve the trending issue. The action may be any suitable action appropriate for the type of trending issue. For example, if the type of trending issue relates to a service or software application being down and/or not responding, one suitable action may include restarting one or more servers to reestablish the service or software application. If the type of trending issue relates to a function of the software application not performing properly, one suitable action may include escalating the trending issue to the engineering team to develop and deploy a software patch to fix the trending issue.

In some embodiments, when a set of text streams are received or obtained, the set of text streams may be input into one or more machine learning models that are trained to identify patterns corresponding to malicious activity or intent and to filter out any text streams that include the identified patterns. These filtered out text streams may be stored in a data store for review. The remaining set of text streams sans the filtered out text streams may be preprocessed by tokenizing one or more words in the text streams, removing one or more words, adding one or more words, removing carriage returns, correcting misspelled words, adjusting formatting, and so forth. The remaining set of preprocessed text streams may be parsed using natural language processing techniques to extract keywords and the number of occurrences of the keywords in the text streams over time. The term "keywords" may refer to a word and/or a phrase that is determined to be of interest. The determination of which keywords to extract may be preset based on knowledge of domain experts or may be learned by a machine learning model based on a set of training data. In some embodiments, weights may be assigned to the keywords based on their relevance to certain issues and the importance of those certain issues. For example, "down" as a keyword may receive a strong weight because the keyword "down" may relate to an issue of a software application or service being down, which may be a relatively important issue.

Historical data of the number of occurrences of the keywords in the text streams over a certain time period (e.g., a 24 hour period) may be used to generate a respective time series for each of the keywords. The time series may represent (e.g., in a line chart, bar chart, table, etc.) the number of occurrences of a respective keyword at each timestamp over the certain time period. Anomaly detection may be applied to the time series by comparing the time series to determine if any of the keywords share a common trait based on the time series. The common trait may refer to an increase of occurrence of the keywords at a certain timestamp in the time series. If any of the keywords share the common trait, those keywords may be identified as anomalous keywords. For each period of time (e.g., the 24 hour period), the anomalous keywords are used to search for every text stream that includes the anomalous keywords that was received in that period of time. The retrieved text streams that include the anomalous keywords may be clustered into one or more clusters of text streams. The clusters of text streams may represent different types of text streams that include some of the same anomalous keywords describing the same issue. In some embodiments, the clusters of text streams may be ranked based on weights assigned to the anomalous keywords present in each of the clusters of text streams. For example, if a first text stream in a cluster includes more occurrences of an anomalous keyword having a strong weight than a second text stream in the cluster, then the first text stream may be ranked higher in the cluster. Moreover, if a first cluster of text streams includes anomalous keywords with stronger weights than a second cluster of text streams, then the first cluster may be ranked higher than the second cluster.

The ranked clusters of text streams may be used to identify a trending issue. For example, a highest ranking cluster of text streams may be determined to represent the trending issue and a notification may be transmitted to a computing device to provide an alert pertaining to the trending issue. In some embodiments, there may be more than one cluster of text streams that each relate to a different trending issue and notifications pertaining to the trending issues represented by a certain number (e.g., top five, top ten, top 20, etc.) of the highest ranking clusters of text streams may be transmitted to the computing device to provide the alerts pertaining to the trending issues.

Various user interfaces of an application executing on the computing device may present the trending issue(s) and/or overall volume of text streams received for certain time periods. Further, the user interfaces may present summary level and detail level information pertaining to keywords (e.g., normal, anomalous), and present the text streams associated with the keywords. In some embodiments, the time series for each keyword may be presented on the user interfaces. The disclosed techniques may provide an enhanced user interface provides the text streams associated with identified trending issues and/or anomalous keywords in a single user interface. This may prevent the user from performing multiple searches attempting to piece together a correlation between myriad text streams to determine whether there is a trending issue. Reducing the number of searches may reduce the network resources, memory resources, and/or processing resources consumed by a server and/or computing device.

These and other embodiments are discussed below with reference to FIGS. 1-13; however, those skilled in the art will readily appreciate that the detailed description given herein with respect to these figures is for explanatory purposes only and should not be construed as limiting.

FIG. 1 illustrates a high-level component diagram of an illustrative system architecture 100, in accordance with some embodiments. In some embodiments, the system architecture 100 may include a computing device 102 communicatively coupled to a cloud-based computing system 104 via a network 106. Another computing device 108 may also be communicatively coupled to the cloud-based computing system 104. As used herein, a cloud-based computing system may refer, without limitation, to any remote computing system accessed over a network. In some instances, the computing device 102 and the computing device 108 may be communicatively coupled via the network 106. Each of computing device 102 and 108 may include one or more processing devices, memory devices, and network interface devices. Network 106 may be a public network (e.g., the Internet), a private network (e.g., a local area network (LAN) or wide area network (WAN)), or a combination thereof.

The computing device 102 may be any suitable computing device, such as a laptop, tablet, smartphone, or computer. The computing device 102 may include a display that is capable of presenting a user interface 110 of an application 112. The application 112 may be implemented in computer instructions stored on the one or more memory devices of the computing device 102 and executable by the one or more processing devices of the computing device 102. The application 112 may be a stand-alone application that is installed on the computing device 102 or may be an application (e.g., website) that executes via a web browser. The user interface 110 may present information pertaining to trending issues detected in text streams, anomalous keywords detected using a time-series generated for each keyword, other keywords extracted from the text streams, an overall volume of text streams received for a certain time period, various actions that are available to be performed, and so forth.

The computing device 108 may be any suitable computing device, such as a laptop, tablet, smartphone, or computer. The computing device 108 may store computer instructions implementing one or more applications on one or more memories, and the computer instructions may be executable by one or more processors of the computing device 108. In some embodiments, the applications may enable a user to generate a text stream 114 that may include alphanumeric characters arranged to form words in a suitable language (e.g., English, Spanish, French, etc.). The words may be arranged to form phrases that are included in sentences. The sentences may be arranged to form paragraphs, and so forth. In an example, the text stream 114 may be included in an electronic message (email). The text stream 114 may describe an issue the user encountered with a software application and/or a computing device provided by an entity.

The computing device 108 may transmit the text stream 114 to the cloud-based computing system 104 via the network 106. In some embodiments, the cloud-based computing system 104 may include one or more servers 116 that form a distributed computing architecture. Each of the servers 110 may include one or more processors, memory devices, data storage, and/or network interface devices. The servers 116 may be in communication with one another via any suitable communication protocol. The servers 116 may include various components, implemented in computer instructions and executable by one or more processors, that automatically identify trending issues in the text streams 114 using textual analysis and provide notifications 118 regarding the trending issues to the computing device 102, as described further below with reference to FIG. 2.

The cloud-based computing system 104 may include a training engine 120 configured to generate one or more machine learning models 122. In some embodiments, the training engine 120 may be included in or separate from the server 116. The training engine 120 may be a rackmount server, a router computer, a personal computer, a portable digital assistant, a smartphone, a laptop computer, a tablet computer, a camera, a video camera, a netbook, a desktop computer, a media center, or any combination of the above. The one or more machine learning models 122 may refer to model artifacts that are created by the training engine 120 using training data that includes training inputs and corresponding target outputs. The training engine 120 may find patterns in the training data that map the training input to the target output, and generate the machine learning models 122 that capture these patterns.

In some embodiments, to generate, train, and validate the machine learning models 122, the training engine 120 may use a training data set including text streams having certain patterns or templates that are determined to correspond to malicious activity or intent. For example, the patterns or templates may reflect an ordering of words and/or sentences that are determined to be associated with spam, scams, and/or phishing. The machine learning models 122 may be trained to identify these patterns or templates in text streams and flag these text streams so that they may be filtered from the set of text streams that are to be used for trending issue identification. The machine learning models 122 may include one or more of a neural network, such as a recurrent neural network, convolutional network, generative adversarial network, a fully connected neural network, or some combination thereof, for example. In some embodiments, the machine learning models 122 may be composed of a single level of linear or non-linear operations or may include multiple levels of non-linear operations. For example, the machine learning model 122 may include numerous layers and/or hidden layers that perform calculations (e.g., dot products) using various neurons.

The machine learning models 122 may identify the text streams 114 that include the patterns or templates, and those text streams 114 may be filtered out and may be stored in a data store 124 of the cloud-based computing system 104. The servers 116 may also use the data store 124 to store the set of text streams that have been preprocessed, the keywords extracted from the text streams, information related to the extracted keywords, the anomalous keywords identified using the time series for each of the keywords, the trending issue that is identified, and so forth. The data store 124 may be separate from or included in any of the servers 116 and/or the training engine 120.

In some embodiments, the filtered out text streams 114 may be reviewed on the user interface 110 by a support representative to determine which patterns or templates are being used in text streams 114 for a given time period. For example, the support representative may determine numerous occurrences of text streams 114 including a particular scam template are received at the same or similar time each day. This information may be useful to further train the machine learning models 122 to finely tune how the machine learning models 122 identify text streams 114 including the patterns or templates associated with malicious activity or intent.

The set of text streams 114 excluding the filtered out text streams may be used to identify the trending issue for a certain time period. When a trending issue is identified using the disclosed techniques, the notification 118 may be transmitted to the computing device 102 via the network 106. The application 112 of the computing device 102 may present, on the user interface 110, various information pertaining to the trending issue identified in the notification 118. This information may enable an action to be performed to resolve the trending issue.

Figure 2:
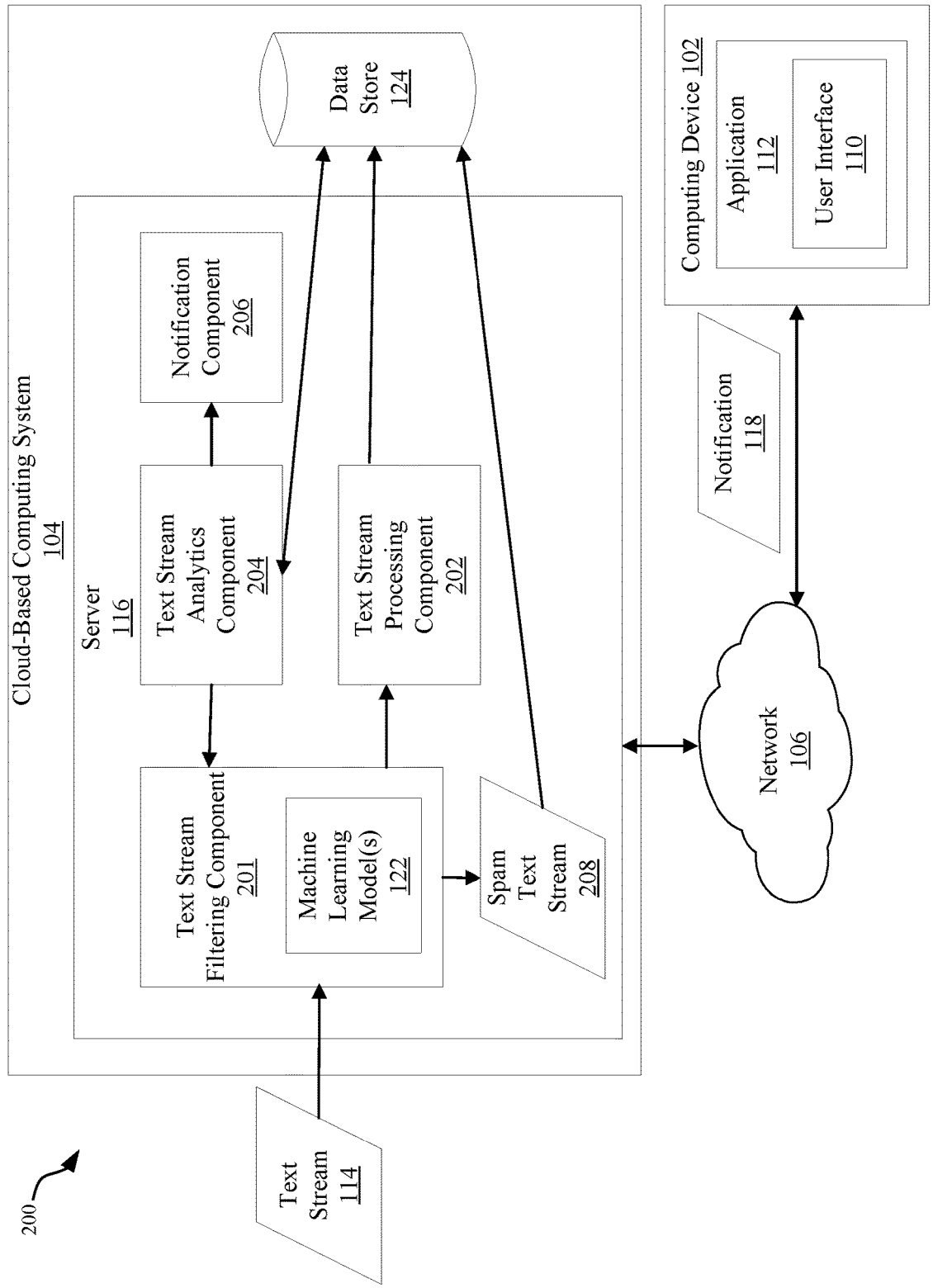
FIG. 2 illustrates a lower-level component diagram of the illustrative system architecture of FIG. 1, in accordance with some embodiments.

FIG. 2 illustrates a lower-level component diagram of the illustrative system architecture 200 of FIG. 1, in accordance with some embodiments. As depicted, the server 116 in the cloud-based computing system 104 includes numerous components, such as a text stream filtering component 201, a text stream processing component 202, a text stream analytics component 204, and a notification component 206. The components 201, 202, 204, and 206 may be implemented in computer instructions stored on one or more memories of the server 116 and may be executable by one or more processors of the server 116. The components 201, 202, 204, and/or 206 may perform operations that are referred to as textual analysis herein.

The text stream filtering component 201 may receive one or more text streams 114 that are sent by the computing device(s) 108 via the network 106. The text streams 114 may be included in emails, social media posts, reviews, dictations, chat histories, etc. The text stream filtering component 201 may input the one or more text streams 114 into the one or more machine learning models that are trained to identify one or more textual patterns or templates that correspond to malicious activity (e.g., spam, scam, phishing, etc.) in the text streams 114. The text streams 114 that are identified as included the textual patterns or templates by the machine learning models 122 may be flagged as spam text streams 208 and may be filtered out from the one or more text streams 114 that are to be processed by the text stream processing component 202. The spam text streams 208 may be stored in the data store 124 for further analysis.

After filtering is complete, the one or more text streams 114 may be sent to the text stream processing component 202. The text stream processing component 202 may transform the text streams 114 into a form that may be consumed by the text stream analytics component 204. For example, the text stream processing component 202 may tokenize certain words in the text. Tokenization may refer to breaking a sequence of strings in the text stream 114 into pieces such as words, keywords, phrases, symbols, and/or other elements referred to as tokens. Tokens may be individual words, phrases, or whole sentences. The text stream processing component 202 may also remove certain punctuation marks and/or stop characters/symbols. The preprocessed text streams 114 may be stored in the data store 124. Each of the preprocessed text streams 114 may be associated with a timestamp at which the text stream 114 was transmitted. The timestamp for each text stream 114 may also be stored in the data store 124, along with other data related to the text stream 114, such as the subject of the text stream 114, the sending address of the text stream 114, and so forth.

The text stream analytics component 204 may retrieve the preprocessed text streams 114 from the data store 124. The text stream analytics component 204 may parse the text streams 114 retrieved from the data store 124 and extract keywords and determine a number of occurrences of the keywords in each of the text streams. The text stream analytics component 204 may assign a weight to each of the keywords. The weights may be preset for certain keywords based on domain expert knowledge. For example, a keyword "unresponsive" may be weighted more heavily than a keyword "username". The text stream analytics component 204 may also retrieve the timestamp corresponding to each of the text streams 114. For a certain time period (e.g., a 24 hour time period), the text stream analytics component 204 may generate a time series for each keyword extracted from the text streams 114 based on the number of occurrences of the keywords and the timestamp of the text streams. Thus, a set of time series may be generated for the keywords. Each time series may represent the number of occurrences of a respective keyword in the text streams 114 for the certain time period based on the timestamps.

The text stream analytics component 204 may perform anomaly detection by comparing the time series for each of the keywords to determine if any of the keywords share a common trait. The common trait may refer to keywords having an increase in occurrences at a certain timestamp in the set of time series. In some embodiments, a determination may be made whether the increase in occurrences for the keywords satisfies a threshold condition (e.g., the increase is a certain number occurrences higher than a threshold number, or is a percentage higher than the number of occurrences at an earlier timestamp, etc.) when determining whether the keywords share the common trait.

Keywords that share the common trait in the set of time series may be identified as anomalous keywords for the certain time period. The text stream analytics component 204 may search the data store 124 for a subset of the text streams 114 that include the anomalous keywords during that certain time period. When the subset of the text streams 114 is retrieved, the text stream analytics component 204 may cluster the subset of the text streams 114 using one or more similarity metrics. The similarity metrics may refer to how similar are the anomalous keywords included in each of the text stream 114 in the retrieved subset. Any suitable clustering technique may be used, such as k-means, where the subset of text streams 114 are partitioned into k clusters in which each text stream belongs to the cluster with the nearest mean. The clusters may represent different types of issues identified based on the similarity of the anomalous keywords included in the subset of text streams 114. For example, text streams 114 including "application" and "down" that are identified as anomalous keywords may be clustered together while text streams 114 including "account" and "billing" that are identified as anomalous keywords may be clustered together.

The text stream analytics component 106 may rank the clusters of text streams 114 based in part on the weights of the anomalous keywords included in the clusters of text streams 114. In some embodiments, the clusters of text streams 114 may be ranked, such that there is a first cluster, a second cluster, and so forth, while the text streams 114 within each of the clusters may also be ranked, such that there is a first text stream, a second text stream, and so forth. In some embodiment, the ranking be used to surface the most relevant cluster as the trending issue and may provide the most representative text stream 114 in that cluster. In some embodiments, each of the clusters may be presented as trending issues in the ranked or unranked order. Further, the text streams 114 included in each cluster may be presented in the ranked or unranked order.

Any information generated by the text stream analytics component 106 may be stored in the data store 124. For example, the anomalous keywords that were detected based on the set of live streams for the keywords may be stored in the data store 124. Further, the data used to produce the live streams may be stored in the data store 124. The clusters of text streams may be stored in the data store 124 in the ranked or unranked order, as well.

The text stream analytics component 106 may transmit the identified trending issues including the text streams 114 that describe the trending issue(s) and the anomalous keywords included in those text streams 114, along with other information, to the notification component 106. The notification component 106 may transmit one or more notifications 118 to the computing device 102 to present the identified trending issue(s) in the text streams 114 and to enable resolution of the trending issue(s).

The text stream analytics component 106 may provide the detected anomalous keywords and/or the text streams including the anomalous keywords to the text stream filtering component 106. The text stream filtering component 106 may use the anomalous keywords and/or text streams including the anomalous keywords to update the machine learning models 122 (e.g., via the training engine 120) to identify subsequent text streams 114 that include similar text streams having the anomalous keywords. This may provide for enhanced identification of the issues described in these text streams 114.

Figure 3:
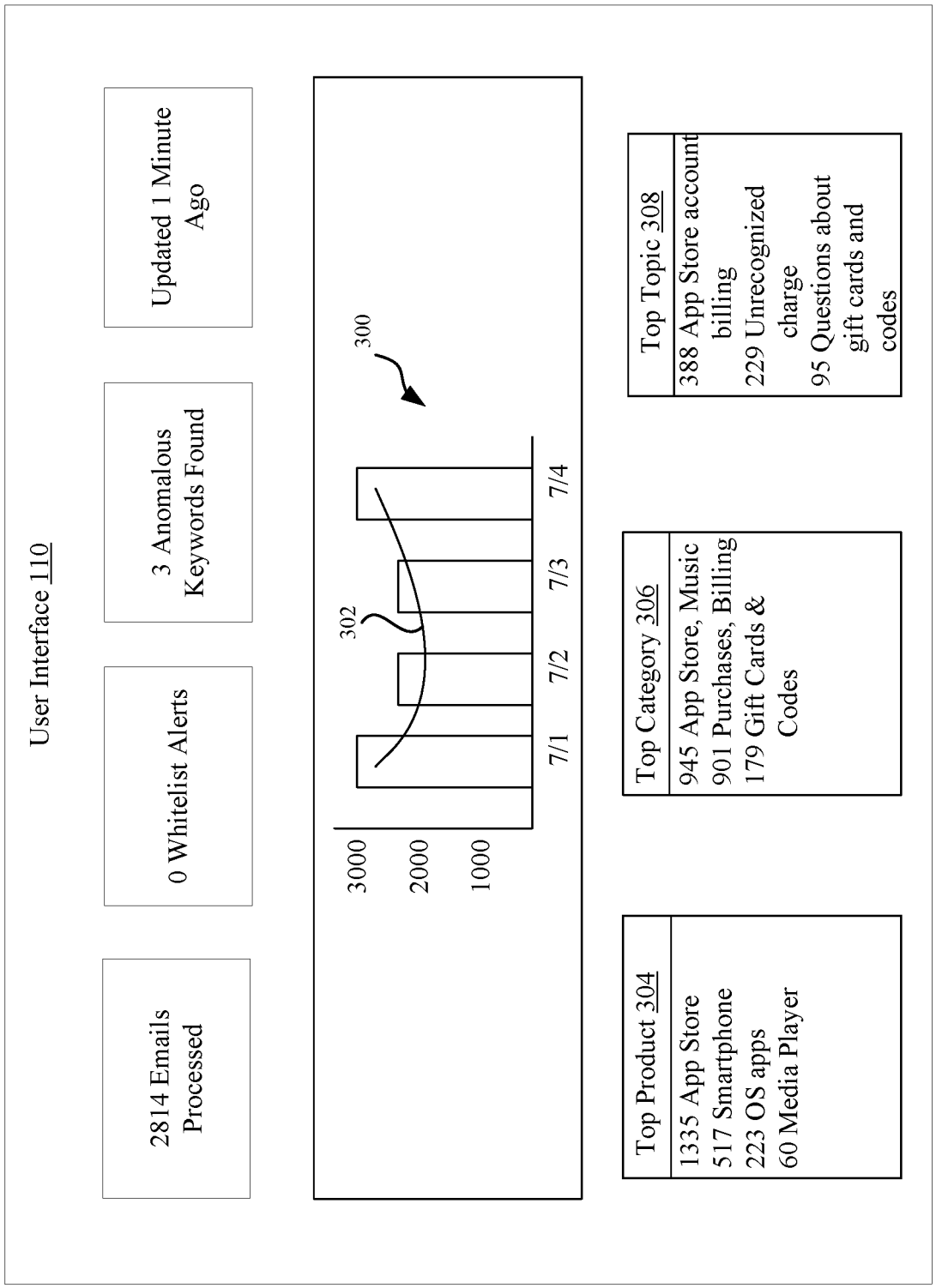
FIG. 3 illustrates an example user interface presenting an overall volume of received text streams, and trending issues identified in the text streams, in accordance with some embodiments.

FIG. 3 illustrates an example user interface 110 presenting an overall volume 300 of received text streams 114, and trending issues identified in the text streams 114, in accordance with some embodiments. The information presented on the user interface 110 may be obtained from the server 116 of the cloud-based computing system 104. The text streams 114 may be included in emails in the depicted example. The overall volume 300 is represented in a bar chart where the number of text streams 114 received are presented on the y-axis and the days for particular period of time that the text streams 114 were received are depicted on the x-axis. As depicted, the bar chart presents the overall volume 100 of text streams 114 for days "7/1", "7/2", "7/3", and "7/4". The overall volume 300 of text streams 114 was approximately 3000 on 7/1, approximately 2200 on 7/2 and 7/3, and approximately 3000 on 7/4. A line 302 in the bar chart illustrates the change in the overall volume 300 between the days.

In addition, various information pertaining to the top trending issues that are identified most frequently in the overall volume 300 of text streams 114 for the particular period of time may be presented on the user interface 110. As discussed herein, the trending issues may be identified in the text streams automatically using textual analysis including at least comparing time series of respective keywords to determine if the keywords share a common trait that corresponds to an anomaly. For example, a visual representation 304 may be presented on the user interface 110 for top products that are referenced in identified trending issues described in the text streams 114. The top products that are reference in identified trending issues include "App Store" 1335 times, "Smartphone" 517 times, "OS apps" 223 times, and "Media Player" 60 times. A visual representation 306 may be presented on the user interface 110 for top categories that are referenced in identified trending issues described in the text streams 114. The top categories that are referenced in identified trending issues include "App Store, Music" 945 times, "Purchases, Billing" 901 times, and "Gift Cards & Codes" 179 times. A visual representation 308 may be presented on the user interface 110 for top topics that are referenced in identified trending issues described in the text streams 114. The top topics that are referenced in identified trending issues include "App Store account billing" 388 times, "Unrecognized charge" 229 times, and "Questions about gift cards and codes" 95 times.

In some embodiments, a support representative may drill-down into the top products, top categories, or top topics to view additional information. For example, the user may drill down by selecting "App Store account billing" to view details related to the anomalous keywords identified and the actual text streams 114 that are related to "App Store account billing" including those anomalous keywords. The support representative may take an action resolve the trending issue corresponding to "App Store account billing".

Figure 4:
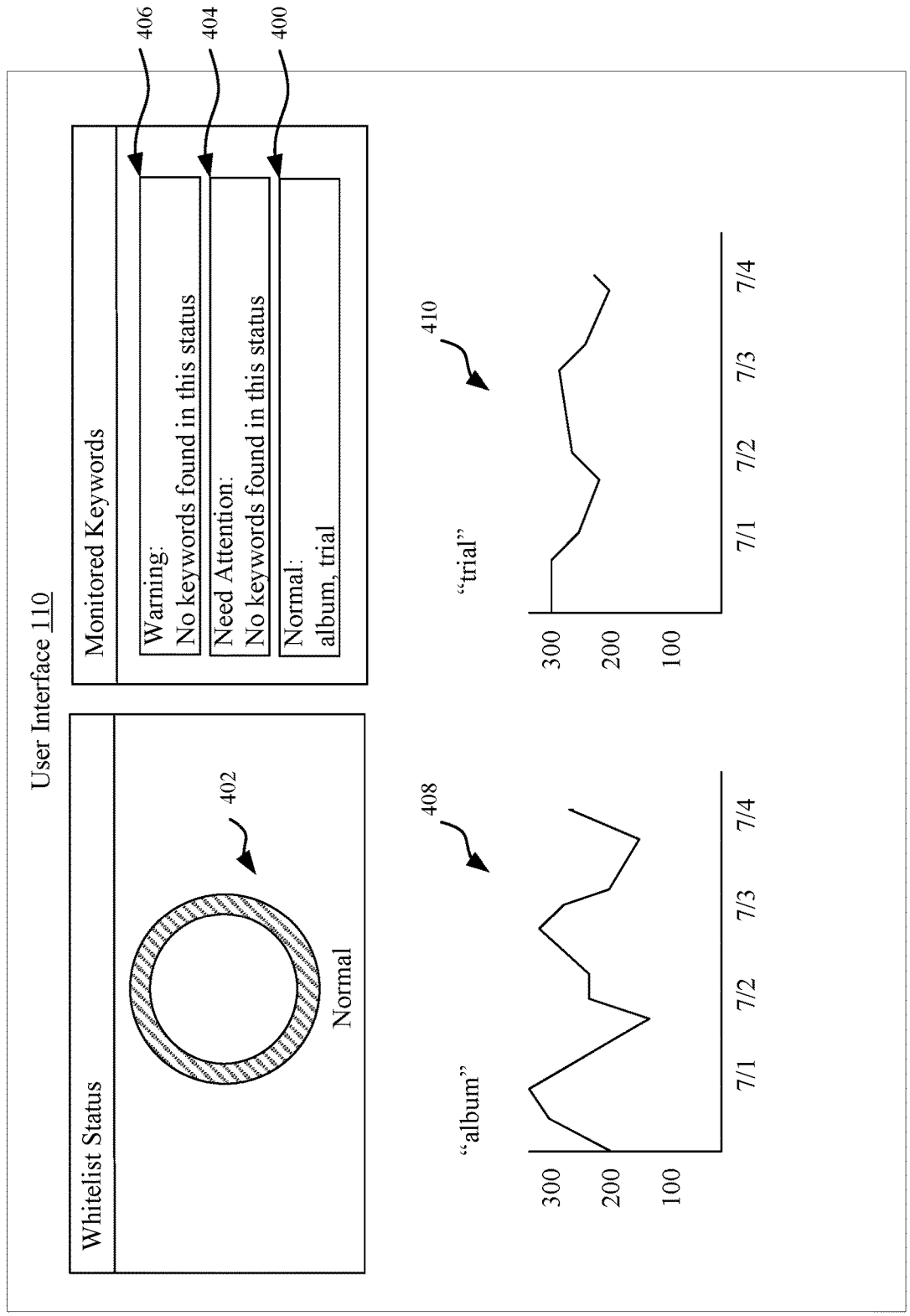
FIG. 4 illustrates an example user interface presenting information pertaining to common keyword usage in text streams, in accordance with some embodiments.

FIG. 4 illustrates an example user interface 110 presenting information pertaining to common keyword usage in text streams 114, in accordance with some embodiments. Common keywords may be preset during configuration based on domain knowledge expertise for certain issues. However, in some embodiments, the common keywords may be monitored to determine whether they are being used more than a threshold amount of times within a threshold period of time both in relation to general features and in content-specific domains. These common keywords may be included on a whitelist of accepted keywords that may be used in text streams 114 while the threshold conditions are not satisfied. There may be various thresholds amount of times set for the common keywords. For example, as depicted, the common keywords "album" and "trial" are being used less than a first threshold and therefore they have been assigned a normal status 400 (further represented by visual representation 402 having a color indicating the normal status 400). If the common keywords are used more than the first threshold amount of times within the threshold period of time, the common keyword may be assigned a need attention status 404. If the common keywords are used more than a second threshold amount of times, higher than the first threshold amount of times, within the threshold period of time, the common keywords may be assigned a warning status 406.

As depicted, a line chart 408 may be presented depicting the occurrences of the common keyword "album" over a number of days, and a line chart 410 may be presented depicting the occurrences of the common keyword "trial" over the number of days. These charts 408 and 410 may further enhance the ability to detect anomalies in text streams 114, which may result in detecting a trending issue that can be solved at an improved rate.

Figure 5:
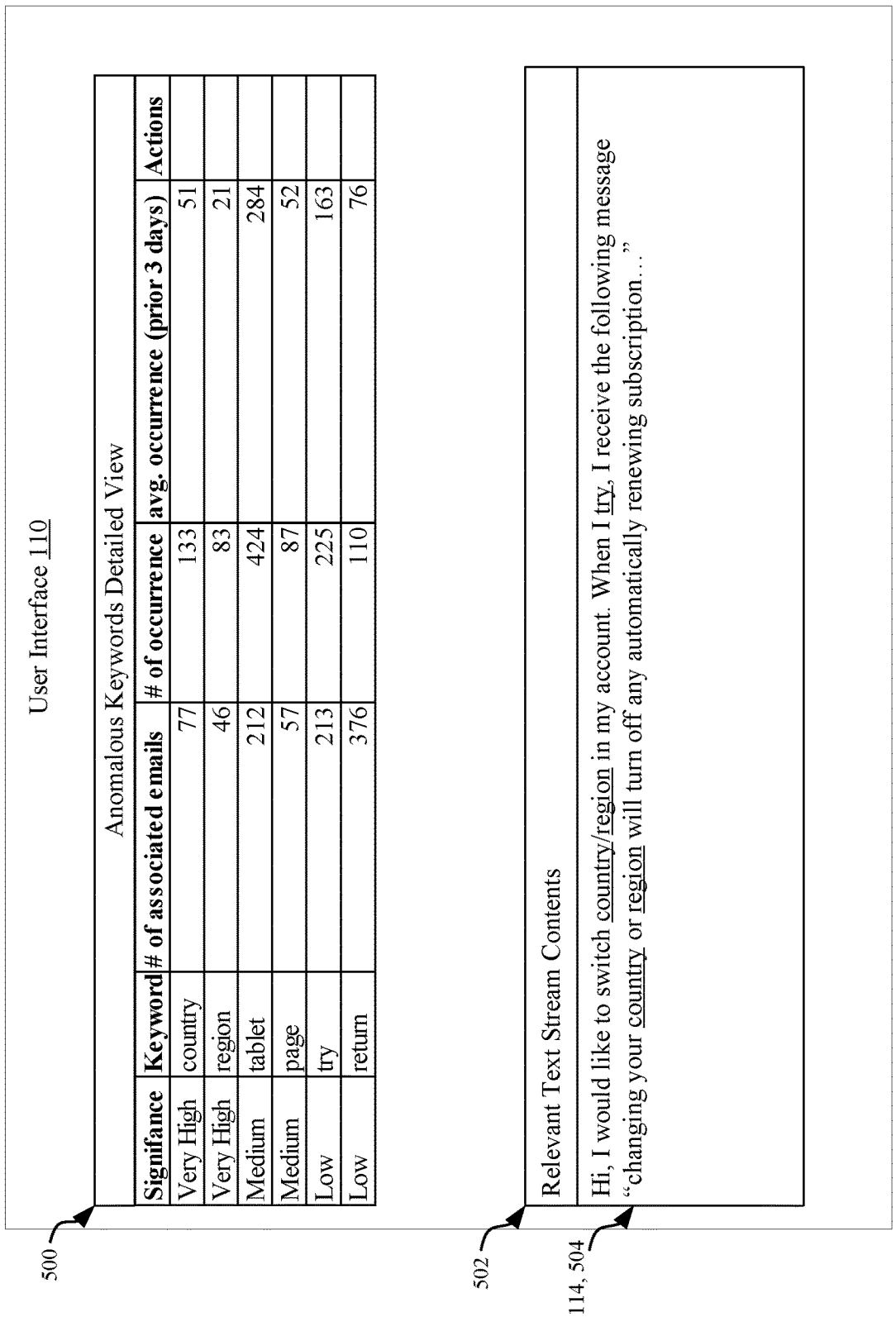
FIG. 5 illustrates an example user interface presenting information pertaining to anomalous keyword usage in text streams, in accordance with some embodiments.

FIG. 5 illustrates an example user interface 110 presenting information pertaining to anomalous keyword usage in text streams 114, in accordance with some embodiments. As discussed herein, the anomalous keywords may be identified in the text streams by comparing time series for each keyword extracted from the text streams 114 to determine whether the keywords share a common trait that corresponds to an anomaly. The user interface 110 includes a section 500 for an anomalous keywords detailed view and a section 502 for relevant text stream contents. The section 500 provides columns for "Significance" which includes values for "Very High", "High", "Medium" and/or "Low". The section 500 also includes a column for "Keyword", "#of associated emails", "#of occurrence", "avg. occurrence (prior 3 days)", and "Actions".

The significance of an anomalous keyword may be determined based on dividing actual statistics versus normal statistics. For example, one normal statistic may be set to fifty for a number of occurrences for a certain keyword in a text stream 114 in a day and the actual occurrence of the certain keyword in the text stream 114 may be two hundred. If the result of the division is a first number (e.g., 0, 1), then the significance may be "Low". If the result of the division is another number (e.g., greater than 1), then the significance is assigned "Medium", "High", or "Very High" based on the degree of variance between the first number and the another number. In some embodiments, the significance of the anomalous keyword may be determined based on one or more factors related to a weight assigned to the anomalous keyword, the number of occurrences of the anomalous keyword in the text streams 114, the number of associated emails in which the anomalous keyword is included, and/or the average occurrence of the anomalous keyword over a period of time.

The "Actions" column may include one or more graphical icons or elements that enable the support representative to perform one or more actions. The actions may enable resolution of an identified trending issue including the particular anomalous keyword in the section 500. The action may include any suitable action based on the type of the trending issue.

The section 502 for relevant text streams provides the content of the text streams including one or more of the anomalous keywords identified in the section 500. The text stream 113 depicted in the section 502 may be an example of a trending issue 504 that is identified using the disclosed techniques. Although just one sample text stream 114 is depicted, it is noted that numerous different text streams 114 including any combination of the anomalous keywords presented in section 500 may be presented in the section 502. As depicted, the anomalous keywords "country", "region" and "try" are emphasized (e.g., underlined) in the text stream 114 presented in section 502. Presenting the anomalous keyword details and the relevant text stream contents including one or more of the anomalous keywords together on the same user interface 110 may enable quick determination of the importance of trending issues 504.

Figure 6:
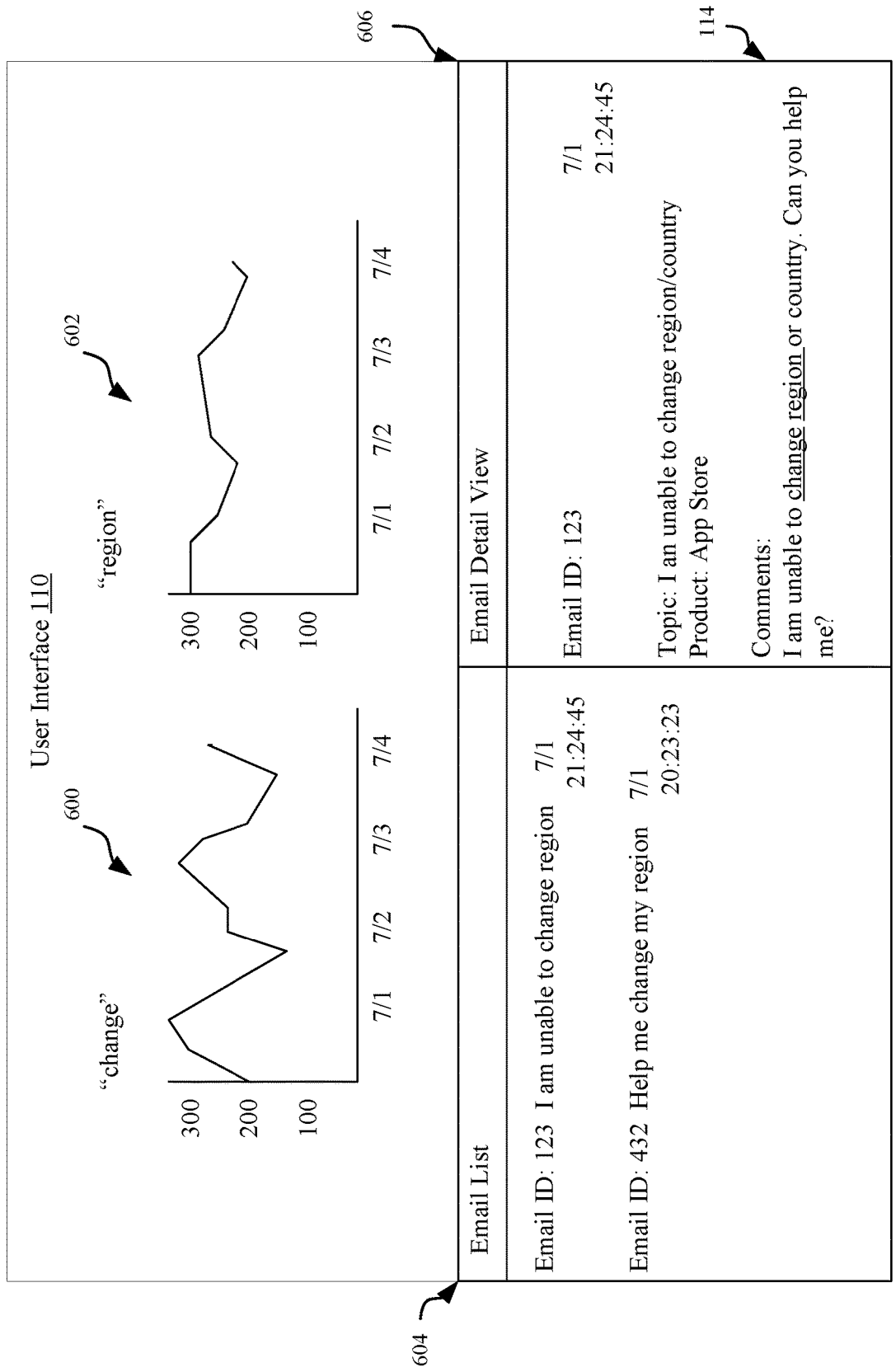
FIG. 6 illustrates an example user interface presenting options to search for additional terms or combination of terms to retrieve text streams including those terms in a given time period, in accordance with some embodiments.

FIG. 6 illustrates an example user interface 110 presenting options to search for additional terms or combination of terms to retrieve text streams 114 including those terms in a given time period, in accordance with some embodiments. For example, the support representative may enter the combination of terms "change" and "region" to be searched in text streams 114 over the time period from 7/1 to 7/4. The user interface 110 may present a line chart 600 for the number of occurrences of "change" in the text streams 114 over the given period of time, and a line chart 602 for the number of occurrences of "region" in the text streams 114 over the given period of time.

Further, a section 604 for a list of emails that include text streams 114 with the searched terms "change" and "region" for the given period of time may be presented in the user interface 110. As depicted, two emails having ID's 123 and 432, respectively, are presented in the section 604. Each email in the list 604 includes a portion of the text stream that is included in the email, as well as a timestamp for the email. If the support representative selects one of the emails in the section 604, additional details of the email may be presented in a section 606 that corresponds to a detail view for the emails. The section 606 displays the email ID, timestamp, topic, product, and the text stream 114 that is included in the email. As depicted, the searched terms "change" and "region" are emphasized in the text stream.

Figure 7:
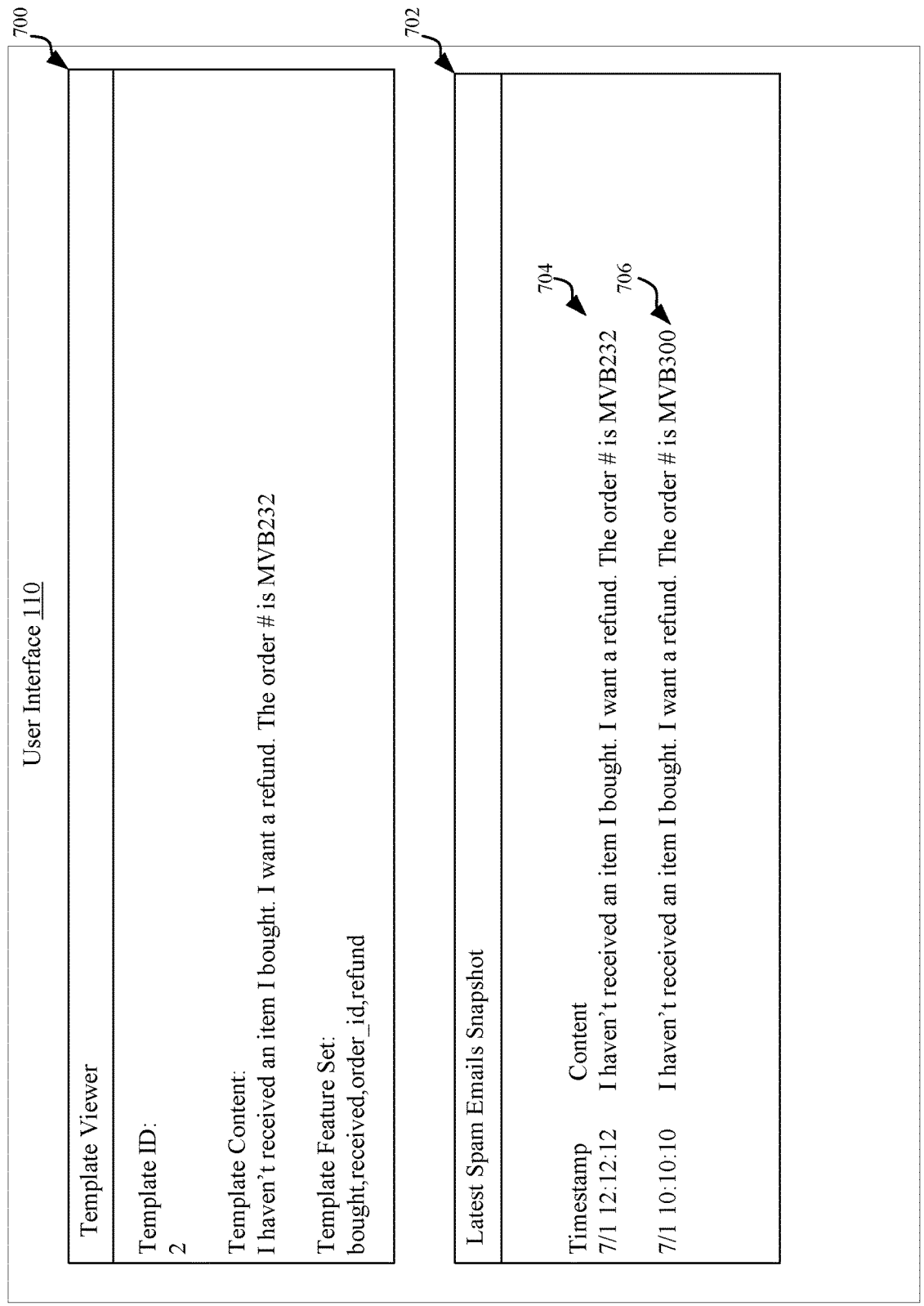
FIG. 7 illustrates an example user interface presenting information pertaining to a spam text stream template detected and the contents of the text streams corresponding to the spam text stream template, in accordance with some embodiments.

FIG. 7 illustrates an example user interface 110 presenting information pertaining to a spam text stream template detected in the text streams 114 received and the contents of the text streams 114 corresponding to the spam text stream template, in accordance with some embodiments. The spam text stream template may be detected by the one or more machine learning models 122 that are trained to identify textual patterns or templates that correspond to malicious activity or intent (e.g., spam, scam, phishing, etc.). These emails may be filtered out from the set of emails that are processed to identify the trending issues 504.

The user interface 110 includes a section 700 for viewing the spam text stream template that is detected. As depicted, the section 700 includes a template ID ("2"), template content of the spam text stream 208 detected ("I haven't received an item I bought. I want a refund. The order #is MVB232"), and a template feature set ("bought,received, order_id,refund").

The user interface 110 includes a section 702 for the corresponding spam emails that use the template for spam text streams. As depicted, there are two emails depicted in section 702 having different timestamps and spam text streams 704 and 706. The spam text streams 704 and 706 include almost identical words and characters except for the order number. Such a user interface 110 may be beneficial in that it provides awareness to the support representatives of the types of malicious emails that are being received.

Figure 8:
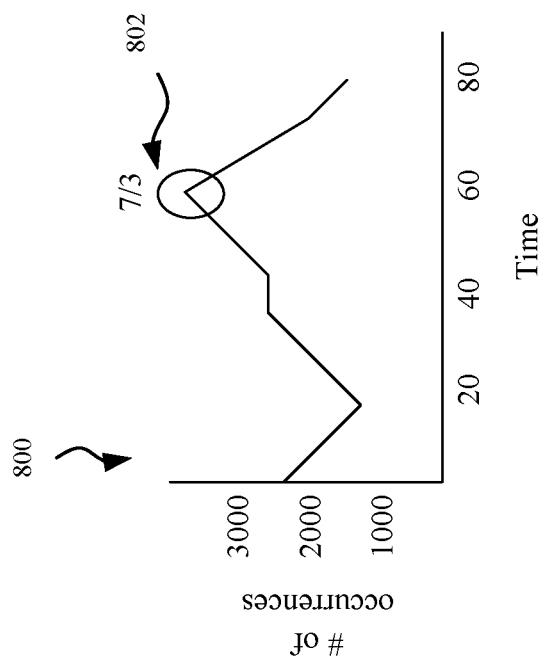
FIG. 8 illustrates an example user interface presenting a graph for monitoring the overall volume of received text streams over a period of time, in accordance with some embodiments.

FIG. 8 illustrates an example user interface 110 presenting a graph 800 for monitoring the overall volume of received text streams 114 over a period of time, in accordance with some embodiments. As depicted, the number of occurrences of the text streams 114 is represented on the y-axis and the time period including timestamps is represented on the x-axis. The graph 800 depicts that a largest volume 802 of text streams was received on around time 60, which may correspond to day 7/3. The largest volume 802 may be greater than the usual volume of text streams 114 received during the other days in the time period. Accordingly, a support representative or a processor may determine if there are any anomalous keywords that can be determined for around time 60.

Figure 9:
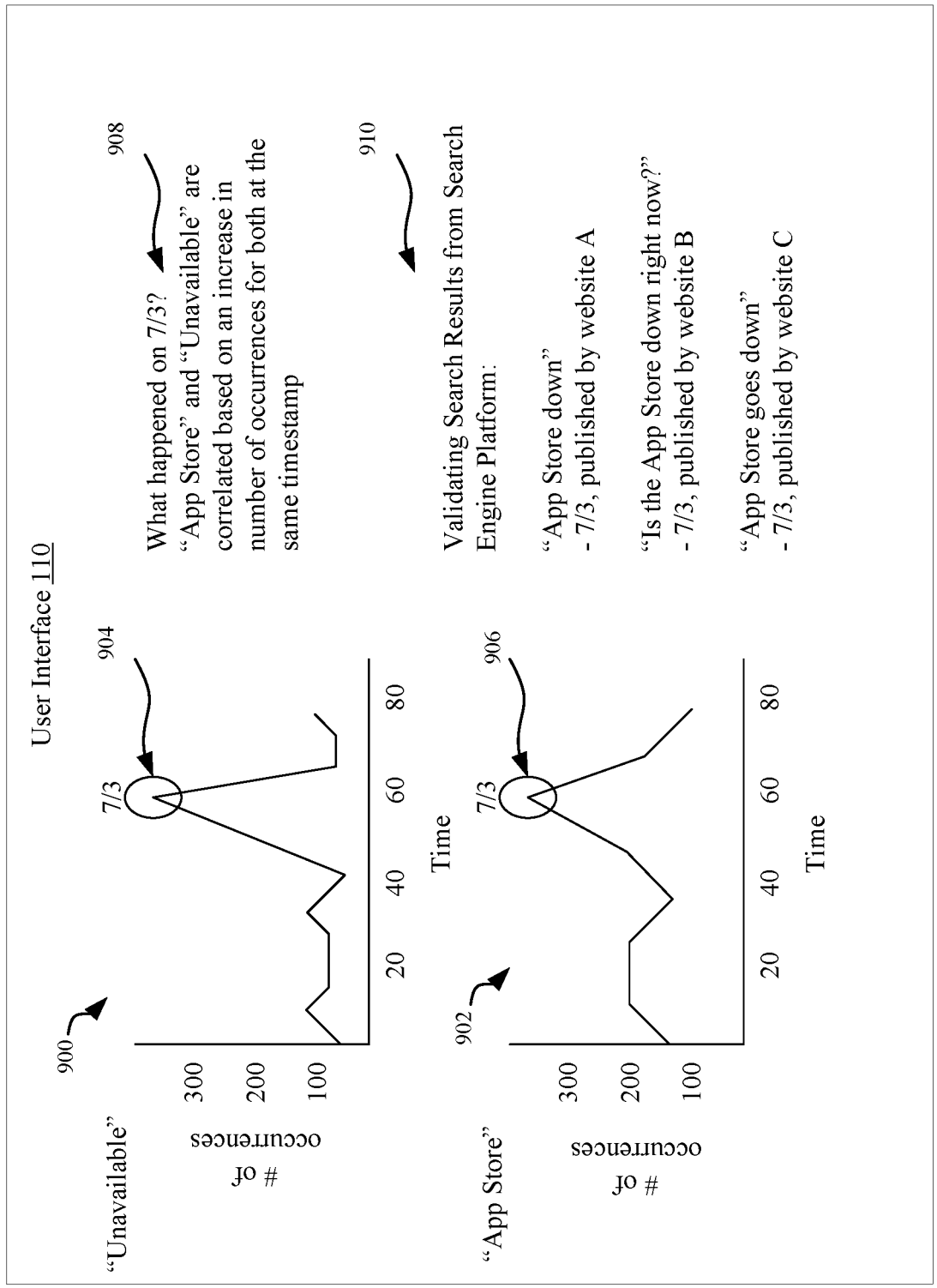
FIG. 9 illustrates an example user interface presenting time series generated for keywords that may be used to determine whether keywords are anomalous keywords, in accordance with some embodiments.

FIG. 9 illustrates an example user interface 110 presenting time series 900 and 902 generated for keywords that may be used to determine whether keywords are anomalous keywords, in accordance with some embodiments. A time series 900 is generated and presented for the keyword "Unavailable", and a time series 902 is generated and presented for the keyword "App Store". As depicted, the time series 900 and 902 represent the number of occurrences of the keywords on the y-axis and the time period including timestamps on the x-axis.

A processor may perform anomaly detection using the time series 900 and 902 for the keywords "Unavailable" and "App Store" to determine whether the keywords share a common trait. The time series 900 and 902 may be compared and it may be determined that the time series 900 includes an increase 904 of the number of occurrences of the keyword "Unavailable" around time 60, and the time series 902 also includes an increase 906 of the number of occurrences of the keyword "App Store" around the time 60. Time 60 may correspond to the day 7/3. Based on the time series 900 and 902, the keywords "Unavailable" and "App Store" share a common trait because they both share an increase 904 and 906 in the number of occurrences at or around the same time. As such, the keywords "Unavailable" and "App Store" may be determined to be anomalous keywords. A visual prompt 908 may be presented that states "What happened on 7/3? "App Store" and "Unavailable" are correlated based on an increase in number of occurrences for both at the same timestamp."

In some embodiments, a search may be performed in the data store 124 for the text streams 114 that include the anomalous keywords "Unavailable" and "App Store" at the certain timestamp (e.g., time 60 corresponding to the day 7/3). The retrieved text streams 114 that include the anomalous keywords at the certain timestamps may be clustered and ranked to identify the trending issue(s) 504 to provide to the computing device 102 to enable an action to be performed to resolve the trending issue(s) 504.

In some embodiments, a cross validation operation may be performed by using a search engine platform to obtain search results using the anomalous keywords (e.g., "Unavailable" and "App Store") and the certain timestamp (e.g., 7/3). As depicted, in section 910 of the user interface 110, the search results include three items found on the Internet, for example, using the search criteria. The three items include (i) "App Store down"—7/3, published by website A; (ii) "Is the App Store down right now?"—7/3, published by website B; (iii) "App Store goes down"—7/3, published by website C. If the search results satisfy a threshold condition pertaining to the anomalous keywords, then the trending issue 504 including the anomalous keywords may be transmitted to the computing device 102. The threshold condition pertaining to the anomalous keywords may refer to a certain number of search results being obtained that include the anomalous keywords for the searched timestamp. If the threshold condition is not satisfied, the anomalous keywords may be discarded and the trending issue 504 may not be validated. As a result, in some embodiments, the trending issue 504 is not sent to the computing device 102.

Figure 10:
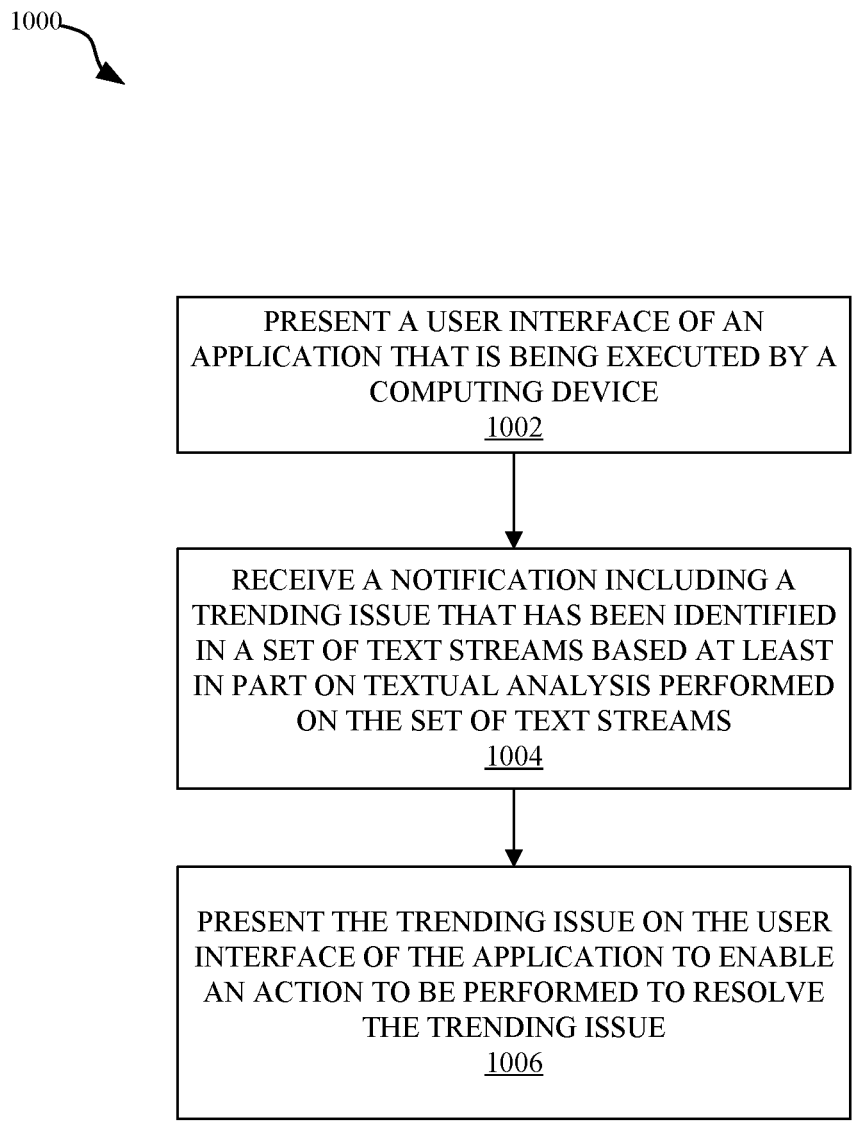
FIG. 10 illustrates a method for improving resolution of a trending issue identified in a set of text streams, in accordance with some embodiments.

FIG. 10 illustrates a method 1000 for improving resolution of a trending issue 504 identified in a set of text streams 114, in accordance with some embodiments. In the following description, the method 1000 is carried out by an entity that is executing on the computing device 102, e.g., the application 112. However, it is noted that other entities can be configured to carry out one or more steps of the method 1000 without departing from the scope of this disclosure, such as the cloud-based computing system 104, for example.

At 1002, a user interface 110 of an application 112 may be presented. The application 112 may be implemented in computer instructions that are being executed by the computing device 102. In some embodiments, the application 112 may be a support application that is used by customer/technical support representatives At 1004, a notification may be received by the computing device 102. The notification may include a trending issue 504 that has been identified in the set of text streams 114 based at least in part on textual analysis performed on the set of text streams. In general, textual analysis may refer to a combination of one or more of filtering out text streams based on content therein, preprocessing content of the text streams, mining keywords of the text streams over time, performing anomaly detection using time series of each keyword, obtaining text streams that include anomalous keywords, clustering the text streams including the anomalous keywords, ranking the clustered text streams, and/or identifying the trending issue based on the ranked clustered text streams. The steps of performing textual analysis are described in greater detail below with regard to method 1200 of FIG. 12.

At 1006, the trending issue 504 may be presented on the user interface 110 of the application 112 to enable an action to be performed to resolve the trending issue 504. For example, the action may include restarting one or more servers associated with a software application or computing device that is the subject of the trending issue, escalating the trending issue to the appropriate channel (e.g., production support, engineering team, etc.), providing a mass response to the users that transmitted emails including the trending issue, and so forth.

Figure 11:
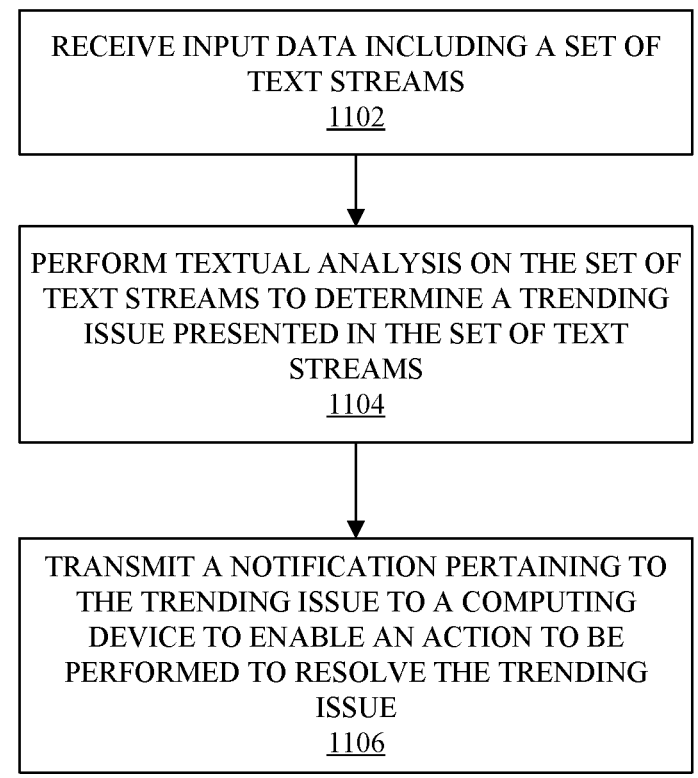
FIG. 11 illustrates a method for identifying a trending issue in input data including a set of text streams, in accordance with some embodiments.

FIG. 11 illustrates a method 1100 for identifying a trending issue 504 in input data including a set of text streams 114, in accordance with some embodiments. In the following description, the method 1100 is carried out by an entity that is executing on the cloud-based computing system 104, e.g., the server 116. However, it is noted that other entities can be configured to carry out one or more steps of the method 1100 without departing from the scope of this disclosure, such as the computing device 102, for example. The method 1100 may identify a trending issue in input data including a set of text streams 114.

At 1102, input data may be received by the server 116, where the input data includes the set of text streams 114. The set of text streams 114 may be included in any one or more of emails, text messages, transcriptions, chat histories, reviews, social media posts, and so forth. The text streams 114 may be received from the computing devices 108. For example, a user may compose an email including a text stream 114 that describes a technical issue of a software application (e.g., a functionality is not working) provided by an entity and transmit the email using the computing device 108 (e.g., laptop, tablet, smartphone).

At 1104, textual analysis may be performed on the set of text streams 114 to determine a trending issue 504 presented in the set of text streams 114. The steps of performing textual analysis are described in greater detail below with regard to method 1200 of FIG. 12. At 1106, a notification 118 may be transmitted to the computing device 102. The notification 118 may pertain to the trending issue 504, and the notification 118 may enable an action to be performed to resolve the trending issue 504.

Figure 12:
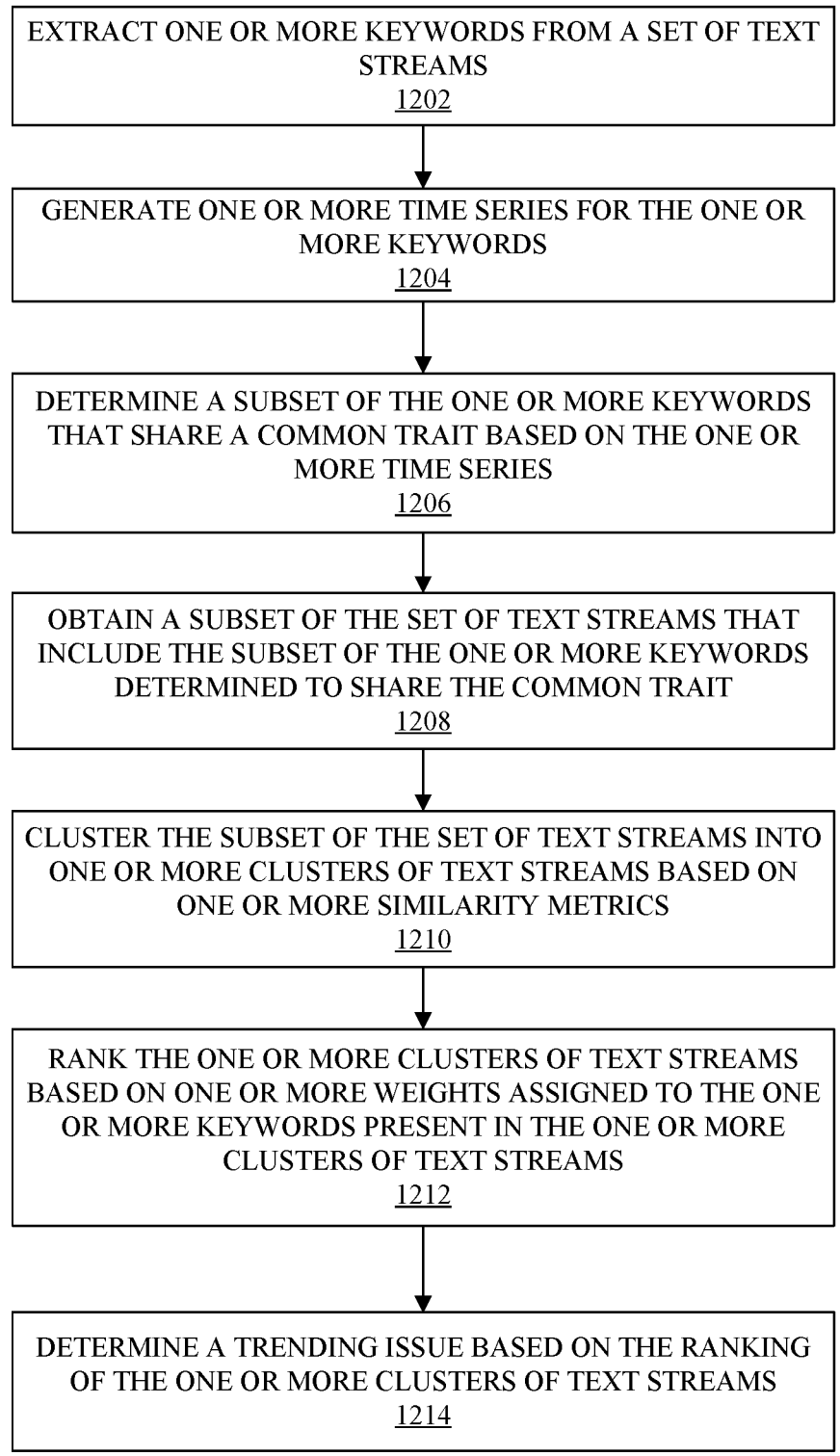
FIG. 12 illustrates a method for performing textual analysis on text streams to identify a trending issue in the text streams, in accordance with some embodiments.

FIG. 12 illustrates a method 1200 for performing textual analysis on text streams 114 to identify a trending issue 504 in the text streams 114, in accordance with some embodiments. In the following description, the method 1200 is carried out by an entity that is executing on the cloud-based computing system 104, e.g., the server 116. However, it is noted that other entities can be configured to carry out one or more steps of the method 1200 without departing from the scope of this disclosure, such as the computing device 102, for example. Method 1200 may improve the resolution of the identified trending issue.

At 1202, one or more keywords may be extracted from a set of text streams 114. The one or more keywords may be extracted using natural language processing techniques to parse each text stream 114 and extract the one or more keywords. The keywords may be extracted based on tokens associated with the keywords. Each of text stream 114 in the set of text streams 114 may be tokenized during a preprocessing step. A number of occurrence of each of the one or more keywords may be determined. Further, the timestamp of each text stream 114 in the set of text streams 114 may be obtained (e.g., from the data store 124).

At 1204, one or more time series (e.g., 900 and/or 902) may be generated for the one or more keywords. A respective time series of the one or more time series may represent a number of the occurrences of a respective keyword of the one or more keywords in the set of text streams 114 over a period of time.

At 1206, a subset of the one or more keywords may be determined, where the subset of the one or more keywords share a common trait based on the one or more time series. The subset of the one or more keywords may be referred to as the anomalous keywords herein. The subset of the one or more keywords may be determined by comparing the one or more time series for the one or more keywords together and identifying the keywords that share the common trait. The common trait may include keywords having an increase in the number of occurrences at a certain timestamp in the one or more time series.

At 1208, a subset of the set of text streams 114 may be obtained, where the subset of the set of text streams includes the subset of the one or more keywords. That is, a search may performed using the data store 124 to obtain the subset of the set of text streams 114 that include the subset of the one or more keywords at the certain timestamp or during a certain time period.

At 1210, the subset of the set of text streams 114 may be clustered into one or more clusters of text streams based on one or more similarity metrics. The similarity metrics may refer to the text streams 114 including a threshold number of the same anomalous keywords. For example, the text streams 114 that include anomalous keywords "App Store" and "Unavailable" may be clustered together and the text streams 114 that include anomalous "Billing" and "Question" may be clustered together. Any suitable clustering technique may be used, such as k-means clustering.

At 1212, the one or more clusters of text streams may be ranked based on one or more weights assigned to the subset of the one or more keywords present in the one or more clusters of text streams. In some embodiments, the weights may refer to the significance described above. A cluster that includes text streams 114 with anomalous keywords having stronger weights than the anomalous keywords included in the other text streams 114 of the other clusters may be ranked higher than the other clusters. Additionally, if the weights of the anomalous keywords included in text streams 114 of different clusters are the same, but one cluster includes more occurrences of the anomalous keywords than another cluster, the cluster including the more occurrences may be ranked higher. Further, the text streams within the clusters may be ranked based on the weights of the anomalous keywords and/or the occurrence of the anomalous keywords included therein.

At 1214, a trending issue 504 may be determined based on the ranking of the one or more clusters of text streams 114. For example, a highest ranking cluster may be selected and the highest ranking text stream in that cluster may be selected as the trending issue 504. In some embodiments, numerous trending issues 504 may be selected. For example, a text stream 114 (e.g., highest ranking text stream) in each of the various clusters may be selected as trending issues 504.

In some embodiments, a notification 118 may be transmitted to the computing device 102. The notification may include the trending issue 504 and information pertaining to the trending issue 504. The application 112 executing on the computing device 102 may present, on the user interface 110, the trending issue 504 and/or information pertaining to the trending issue 504. Various actions may be presented on the user interface 110 to enable the support representative to take direct action on the trending issue as desired. For example, the support representative may immediately escalate the trending issue to another group (e.g., production support, engineering team, etc.) based on what type of trending issue 504 is detected. In another example, the support representative may respond to the user with solution instructions if the trending issue 504 can be solved by the user that submitted the text stream 114. In another example, if the trending issue 504 is of a type that the support representative is capable of resolving without involving others, then the support representative may perform the action to directly resolve the trending issue 504.

Figure 13:
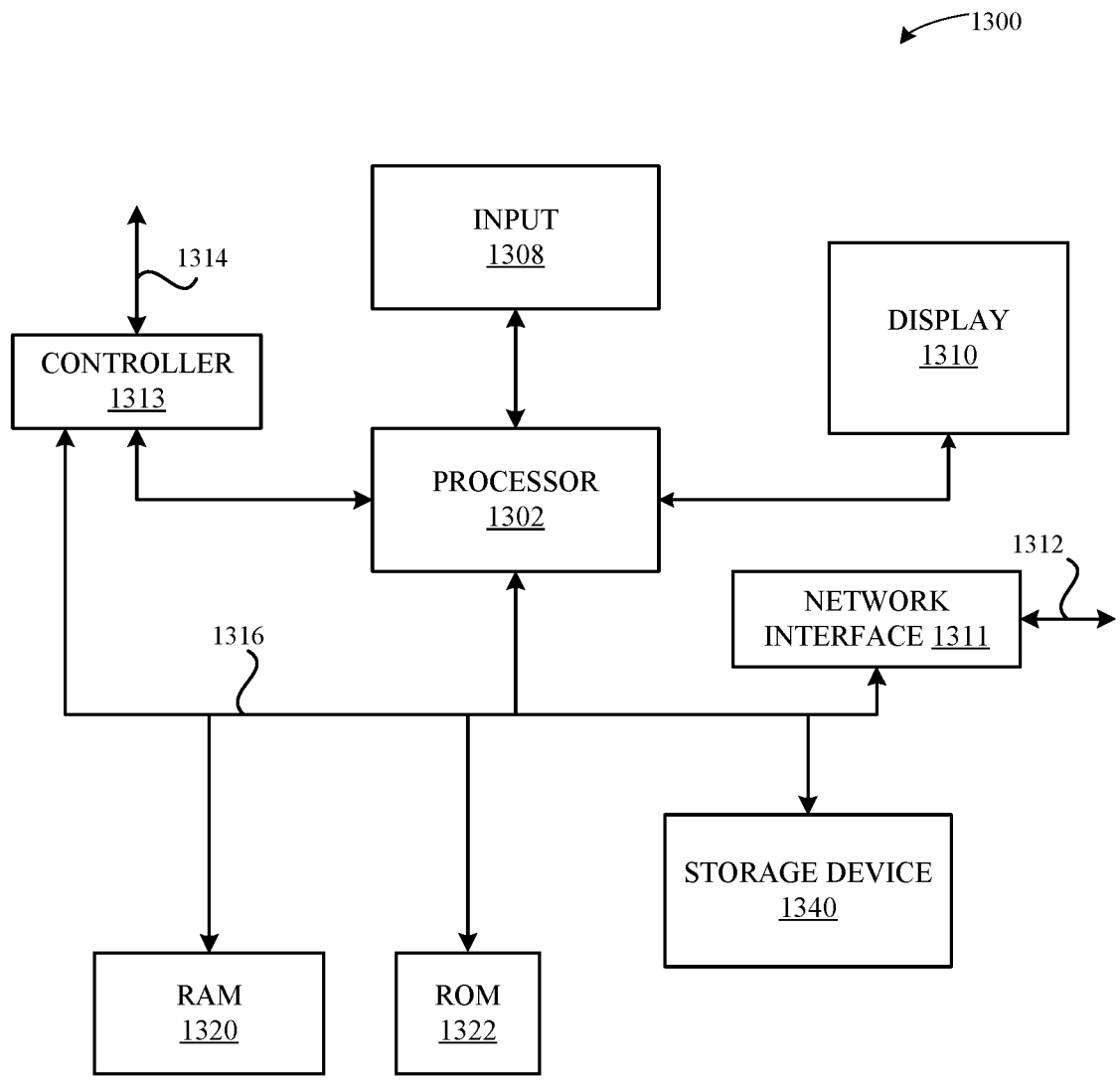
FIG. 13 illustrates a detailed view of an exemplary computing device that can be used to implement the various apparatus and/or methods described herein, in accordance with some embodiments.

FIG. 13 illustrates a detailed view of an exemplary computing device 1300 that can be used to implement the various apparatus and/or methods described herein, in accordance with some embodiments. In particular, the detailed view illustrates various components that can be included in any of the computing device 102, the computing device 108, and/or the cloud-based computing system 104 (e.g., the server 116 and/or the training engine 120) illustrated in FIG. 1 and/or described herein.

As shown in FIG. 13, the computing device 1300 can include a processor 1302 that represents a microprocessor or controller for controlling the overall operation of computing device 1300. The computing device 1300 can also include a user input device 1308 that allows a user of the computing device 1300 to interact with the computing device 1300. For example, the user input device 1308 can take a variety of forms, such as a button, keypad, dial, touch screen, audio input interface, visual/image capture input interface, input in the form of sensor data, etc. Still further, the computing device 1300 can include a display 1310 (screen display) that can be controlled by the processor 1302 to present visual information to the user. A data bus 1316 can facilitate data transfer between at least a storage device 1340, the processor 1302, and a controller 1313. The controller 1313 can be used to interface with and control different equipment through an equipment control bus 1314. The computing device 1300 can also include a network/bus interface 1311 that couples to a data link 1312. In the case of a wireless connection, the network/bus interface 1311 can include a wireless transceiver.

The computing device 1300 also include a storage device 1340, which can comprise a single disk or a plurality of disks (e.g., hard drives), and includes a storage management module that manages one or more partitions within the storage device 1340. In some embodiments, storage device 1340 can include flash memory, semiconductor (solid state) memory or the like. The computing device 1300 can also include a Random Access Memory (RAM) 1320 and a Read-Only Memory (ROM) 1322. The ROM 1322 can store programs, utilities or processes to be executed in a non-volatile manner. The RAM 1320 can provide volatile data storage, and stores instructions related to the operation of the computing device 1300.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The non-transitory computer readable medium is any data storage device that can store data which can thereafter be read by a computer system. Examples of the non-transitory computer readable medium include read-only memory, random-access memory, CD-ROMs, HDDs, DVDs, magnetic tape, and optical data storage devices. The non-transitory computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments.

Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A non-transitory computer readable storage medium tangibly encoded with instructions that, when executed by a server, perform a method comprising:
   receiving, by the server, over a network, a plurality of text streams;
   executing, by the server, a textual analysis model, the execution comprising analyzing, by the server, each of the plurality of text streams via the textual analysis model;
   determining, by the server, based on the analysis, a trending issue presented in the plurality of text streams, the trending issue corresponding to a computerized operation associated with a device on the network;
   identifying, by the server, a solution for resolving the trending issue, the solution comprising automatically executable computerized instructions that address the computerized operation of the trending issue;
   generating, by the server, information for implementing the solution; and
   automatically executing, by the server over the network, the solution, the execution of the solution comprising transmitting, by the server to the device over the network the generated information, the transmission automatically causing the device to enact, without user input, the solution to resolve the trending issue.

2. The non-transitory computer readable storage medium of claim 1, wherein execution of the textual analysis model further comprises:
   extracting one or more keywords from the plurality of text streams; and
   generating one or more time series for the one or more keywords, wherein a respective time series of the one or more time series represents a number of occurrences of a respective keyword of the one or more keywords in the plurality of text streams over a period of time.

3. The non-transitory computer readable storage medium of claim 2, further comprising:
   determining a subset of the one or more keywords that share a common trait based on the one or more time series, wherein the common trait comprises an increase in occurrences of the one or more keywords at a certain timestamp in the one or more time series or a decrease in occurrences of the one or more keywords at the certain timestamp in the one or more time series.

4. The non-transitory computer readable storage medium of claim 3, further comprising:
   obtaining a subset of the plurality of text streams that include the subset of the one or more keywords determined to share the common trait;
   clustering the subset of the plurality of text streams into one or more clusters of text streams based on one or more similarity metrics; and
   ranking the one or more clusters of text streams based on one or more weights assigned to each of the subset of the one or more keywords present in the one or more clusters of text streams; and
   determining the trending issue based on the ranking of the one or more clusters of text streams.

5. The non-transitory computer readable storage medium of claim 3, further comprising:
   obtaining, using a search engine platform, search results using the subset of the one or more keywords and the certain timestamp;
   determining whether the search results satisfy a threshold condition pertaining to the subset of the one or more keywords; and
   responsive to determining that the search results satisfy the threshold condition pertaining to the subset of the one or more keywords, determining the trending issue causing the trending issue to be presented on a user interface, wherein the trending issue relates to the subset of the one or more keywords.

6. The non-transitory computer readable storage medium of claim 1, wherein execution of the textual analysis model further comprises:
   filtering the plurality of text streams using one or more machine learning models trained to identify one or more textual patterns in the plurality of text streams.

7. The non-transitory computer readable storage medium of claim 1, wherein execution of the textual analysis model further comprises:
   preprocessing the plurality of text streams by tokenizing a portion of the plurality of text streams, removing one or more words from the plurality of text streams, or some combination thereof.

8. The non-transitory computer readable storage medium of claim 1, wherein each of the plurality of text streams are included in a respective electronic message, a respective transcription, a respective chat history, a respective social media post, or a respective review.

9. A method comprising:
   receiving, by a server, over a network, a plurality of text streams;
   executing, by the server, a textual analysis model, the execution comprising analyzing, by the server, each of the plurality of text streams via the textual analysis model;
   determining, by the server, based on the analysis, a trending issue presented in the plurality of text streams, the trending issue corresponding to a computerized operation associated with a device on the network;
   identifying, by the server, a solution for resolving the trending issue, the solution comprising automatically executable computerized instructions that address the computerized operation of the trending issue;
   generating, by the server, information for implementing the solution; and
   automatically executing, by the server over the network, the solution, the execution of the solution comprising transmitting, by the server to the device over the network the generated information, the transmission automatically causing the device to enact, without user input, the solution to resolve the trending issue.

10. The method of claim 9, wherein performing the textual analysis on the plurality of text streams further comprises:
    extracting one or more keywords from the plurality of text streams; and
    generating one or more time series for the one or more keywords, wherein a respective time series of the one or more time series represents a number of occurrences of a respective keyword of the one or more keywords in the plurality of text streams over a period of time.

11. The method of claim 10, further comprising:
    determining a subset of the one or more keywords that share a common trait based on the one or more time series, wherein the common trait comprises an increase in occurrences of the one or more keywords at a certain timestamp in the one or more time series or a decrease in occurrences of the one or more keywords at the certain timestamp in the one or more time series.

12. The method of claim 11, further comprising:
    obtaining a subset of the plurality of text streams that include the subset of the one or more keywords determined to share the common trait;
    clustering the subset of the plurality of text streams into one or more clusters of text streams based on one or more similarity metrics; and
    ranking the one or more clusters of text streams based on one or more weights assigned to each of the subset of the one or more keywords present in the one or more clusters of text streams; and
    determining the trending issue based on the ranking of the one or more clusters of text streams.

13. The method of claim 11, further comprising:
    obtaining, using a search engine platform, search results using the subset of the one or more keywords and the certain timestamp;
    determining whether the search results satisfy a threshold condition pertaining to the subset of the one or more keywords; and
    responsive to determining that the search results satisfy the threshold condition pertaining to the subset of the one or more keywords, determining the trending issue causing the trending issue to be presented on a user interface, wherein the trending issue relates to the subset of the one or more keywords.

14. The method of claim 9, wherein execution of the textual analysis model further comprises:
    filtering the plurality of text streams using one or more machine learning models trained to identify one or more textual patterns in the plurality of text streams.

15. The method of claim 9, wherein execution of the textual analysis model further comprises:
    preprocessing the plurality of text streams by tokenizing a portion of the plurality of text streams, removing one or more words from the plurality of text streams, or some combination thereof.

16. The method of claim 9, wherein each of the plurality of text streams are included in a respective electronic message, a respective transcription, a respective chat history, a respective social media post, or a respective review.

17. A server comprising:
    at least one processor configured to:
      receive, over a network, a plurality of text streams;
      execute a textual analysis model, the execution comprising analyzing, by the server, each of the plurality of text streams via the textual analysis model;
      determine, based on the analysis, a trending issue presented in the plurality of text streams, the trending issue corresponding to a computerized operation associated with a device on the network;
      identify a solution for resolving the trending issue, the solution comprising automatically executable computerized instructions that address the computerized operation of the trending issue;
      generate information for implementing the solution; and
      automatically execute, over the network, the solution, the execution of the solution comprising transmitting, to the device over the network, the generated information, the transmission automatically causing the device to enact, without user input, the solution to resolve the trending issue.

18. The server of claim 17, wherein the at least one processor is further configured to:
   extract one or more keywords from the plurality of text streams; and
   generate one or more time series for the one or more keywords, wherein a respective time series of the one or more time series represents a number of occurrences of a respective keyword of the one or more keywords in the plurality of text streams over a period of time.

19. The server of claim 18, wherein the at least one processor is further configured to:
   determine a subset of the one or more keywords that share a common trait based on the one or more time series, wherein the common trait comprises an increase in occurrences of the one or more keywords at a certain timestamp in the one or more time series or a decrease in occurrences of the one or more keywords at the certain timestamp in the one or more time series.

20. The server of claim 19, wherein the at least one processor is further configured to:
   obtain a subset of the plurality of text streams that include the subset of the one or more keywords determined to share the common trait;
   cluster the subset of the plurality of text streams into one or more clusters of text streams based on one or more similarity metrics; and
   rank the one or more clusters of text streams based on one or more weights assigned to each of the subset of the one or more keywords present in the one or more clusters of text streams; and
   determine the trending issue based on the ranking of the one or more clusters of text streams.

\* \* \* \* \*

UNITED STATES PATENT AND TRADEMARK OFFICE
CERTIFICATE OF CORRECTION

PATENT NO. : 11,520,983 B2
APPLICATION NO. : 16/425854
DATED : December 6, 2022
INVENTOR(S) : Jiachen Li et al.

It is certified that error appears in the above-identified patent and that said Letters Patent is hereby corrected as shown below:

In the Specification

At Column 9, Line 51: "The text stream analytics component 106 may rank the" should read -- The text stream analytics component 204 may rank the --.

At Column 9, Line 67: "component 106 may be stored in the data store 124. For" should read -- component 204 may be stored in the data store 124. For --.

At Column 10, Line 7: "The text stream analytics component 106 may transmit" should read -- The text stream analytics component 204 may transmit --.

At Column 10, Line 11-12: "information, to the notification component 106. The notification component 106 may transmit one or more notifica-" should read -- information, to the notification component 206. The notification component 206 may transmit one or more notifica- --.

At Column 10, Line 16: "The text stream analytics component 106 may provide the" should read -- The text stream analytics component 204 may provide the --.

At Column 10, Line 19: "ing component 106. The text stream filtering component 106" should read -- ing component 201. The text stream filtering component 201 --.

Signed and Sealed this
Second Day of July, 2024

Katherine Kelly Vidal
*Director of the United States Patent and Trademark Office*